(12) United States Patent
Thorpe

(10) Patent No.: US 7,664,967 B2
(45) Date of Patent: Feb. 16, 2010

(54) DEVELOPMENT SYSTEM WITH METHODOLOGY PROVIDING INFORMATION HIDING IN EXECUTABLE PROGRAMS

(75) Inventor: Daniel R. Thorpe, Scotts Valley, CA (US)

(73) Assignee: Borland Software Corporation, Austin, TX (US)

( * ) Notice: Subject to any disclaimer, the term of this patent is extended or adjusted under 35 U.S.C. 154(b) by 926 days.

(21) Appl. No.: 10/905,263

(22) Filed: Dec. 22, 2004

(65) Prior Publication Data

US 2006/0136875 A1 Jun. 22, 2006

(51) Int. Cl.
G06F 12/14 (2006.01)
(52) U.S. Cl. .............................. 713/193; 713/1; 713/2; 713/100; 713/190; 717/100; 717/127
(58) Field of Classification Search ................ 382/100, 382/226; 713/1, 2, 100, 176, 170, 190, 193; 714/746; 717/100, 127
See application file for complete search history.

(56) References Cited

U.S. PATENT DOCUMENTS

| 4,465,901 | A | 8/1984 | Best | 713/190 |
|---|---|---|---|---|
| 4,658,093 | A | 4/1987 | Hellman | 705/52 |
| 5,182,770 | A | 1/1993 | Medveczky et al. | 705/56 |
| 5,615,061 | A | 3/1997 | Singh | 360/60 |
| 5,687,236 | A | 11/1997 | Moskowitz et al. | 380/28 |
| 5,745,569 | A | 4/1998 | Moskowitz et al. | 705/58 |
| 5,903,917 | A * | 5/1999 | Douceur et al. | 711/201 |
| 6,185,683 | B1 | 2/2001 | Ginter et al. | 713/176 |
| 6,243,468 | B1 | 6/2001 | Pearce et al. | 380/255 |
| 6,334,189 | B1 | 12/2001 | Granger et al. | 713/200 |
| 6,480,959 | B1 | 11/2002 | Granger et al. | 713/189 |
| 6,523,119 | B2 * | 2/2003 | Pavlin et al. | 713/192 |
| 6,553,129 | B1 | 4/2003 | Rhoads | 382/100 |
| 6,636,689 | B1 | 10/2003 | Stebbings | 386/94 |
| 6,643,775 | B1 | 11/2003 | Granger et al. | 713/190 |
| 6,654,887 | B2 | 11/2003 | Rhoads | 713/176 |
| 6,687,385 | B1 | 2/2004 | Handley | 382/100 |
| 6,697,498 | B2 | 2/2004 | Kawaguchi et al. | 382/100 |
| 6,735,696 | B1 | 5/2004 | Hannah | 713/189 |
| 6,757,406 | B2 | 6/2004 | Rhoads | 382/100 |
| 6,757,826 | B1 | 6/2004 | Paltenghe | 713/170 |
| 6,760,463 | B2 | 7/2004 | Rhoads | 382/100 |
| 6,768,808 | B2 | 7/2004 | Rhoads | 382/100 |

(Continued)

OTHER PUBLICATIONS

El-Khalil, Rakan et el., Hydan: Hiding Information in Program Binaries, presented at CodeCon Feb. 23, 2003.

(Continued)

Primary Examiner—Thanhnga B Truong
(74) Attorney, Agent, or Firm—Kokka & Backus, PC

(57) ABSTRACT

A development system providing a method for information hiding in executable programs is described. In one embodiment, for example, a method of the present invention is described for hiding information in computer programs, the method comprises steps of: receiving first input comprising program modules for a computer program being created, the program modules including data and code; receiving second input comprising information to be hidden in the computer program; linking together the program modules to form an executable computer program, including determining pads necessary for aligning data and code; and hiding the second input in the executable computer program by storing portions of the second input at locations in the executable computer program intended for pads.

34 Claims, 7 Drawing Sheets

U.S. PATENT DOCUMENTS

| | | | |
|---|---|---|---|
| 6,771,597 B2 | 8/2004 | Makansi et al. | 370/230 |
| 6,775,392 B1 | 8/2004 | Rhoads | 382/100 |
| 6,778,679 B1 | 8/2004 | Handley | 382/100 |
| 6,778,682 B2 | 8/2004 | Rhoads | 382/100 |
| 6,785,814 B1 | 8/2004 | Usami et al. | 713/176 |
| 6,788,800 B1 | 9/2004 | Carr et al. | 382/100 |
| 6,804,377 B2 | 10/2004 | Reed et al. | 382/100 |
| 6,804,378 B2 | 10/2004 | Rhoads | 382/100 |
| 6,813,366 B1 | 11/2004 | Rhoads | 382/100 |
| 6,823,075 B2 | 11/2004 | Perry | 382/100 |
| 6,829,368 B2 | 12/2004 | Meyer et al. | 382/100 |
| 6,831,991 B2 | 12/2004 | Fridrich et al. | 382/100 |
| 6,978,035 B2 * | 12/2005 | Kawaguchi et al. | 382/100 |
| 2005/0038794 A1 * | 2/2005 | Piersol | 707/100 |
| 2005/0149812 A1 * | 7/2005 | Hall et al. | 714/746 |

OTHER PUBLICATIONS

Pietrek, Matt, Peering Inside the PE: a Tour of the Win32 Portable Executable File Format, Microsoft MSDN, Mar. 1994.

* cited by examiner

DEVELOPMENT SYSTEM WITH METHODOLOGY PROVIDING INFORMATION HIDING IN EXECUTABLE PROGRAMS

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to software development systems and, more particularly, to a development system providing a methodology for hiding (steganographic embedding) information in a software program.

2. Description of the Background Art

Software is very easy to copy and distribute without any indication of who the original copy was licensed to. This is a significant concern for electronic distribution of commercial software, since there is no way to tell the difference between the original software download provided by the vendor and a copy of that software provided for download by unauthorized parties. As a result, illegally copied applications continue to be distributed on a wide-scale basis over the Internet, with software developers losing billions of dollars per year as a result.

Digitally stamping software with some sort of identifier is one possible technique for detecting and tracing unauthorized copies of software packages. For example, licensee or license key information can be embedded into an executable in a variety of ways, ranging from appending the data to the executable in clear text, to encrypting the data appended to the executable, to appending the data and encrypting the entire executable. Besides allowing one to trace software, this information can be used to prevent software from being executed, manipulated, or copied. To date, however, such identification data is easy to remove and thus does not provide a sufficient obstacle to unauthorized copying and distribution of the software.

Another approach is a technique to encode data in an executable file (e.g., .exe file on Microsoft Windows systems) by rewriting the machine opcodes using different equivalent instructions or instruction sequences. See, e.g., "Hydan: Hiding Information in Program Binaries" by Rakan El-Khalil and Angelos D. Keromytis, available via the Internet (currently available at www1.cs.columbia.edu/~angelos/Papers/hydan-.pdf, and at www.crazyboy.com/hydan/), the disclosure of which is hereby incorporated by reference for purposes of indicating the background of the invention or illustrating the state of the art. Owing to their digital nature, computers essentially only understand "machine code," i.e., the low-level, minute operational codes or instructions ("opcodes") for performing specific tasks. Opcodes are therefore the executable binary instructions—the sequence of ones and zeros—that are interpreted as specific instructions by the computer's microprocessor, such as Intel x86 microprocessor (e.g., Intel Pentium). The opcode-based approach to encode or hide data has the advantage that the embedded data is difficult to find (e.g., in a debugger tool). The technique of rewriting the opcodes is problematic, however, as changing the opcode sequence or stream may cause less-than-optimal instructions to be used, thus potentially degrading software performance. For example, "jump" (JMP) instructions may take longer to execute than the original encoding. As another shortcoming, the data bandwidth available to be carried by the technique is very small. This results from the fact that rewriting the opcodes only allows for a few additional bits to be accommodated over a given section of code, such as only 1 bit per 100 bytes. Therefore, one would need to have a rather large executable file in order to embed just a modest amount of additional information using this technique.

The approach also suffers from being tied to a specific instruction set (e.g., x86 opcodes), and may even be tied to a specific model of a processor (e.g., dependent on Intel Pentium 4's flexibility with processing instructions). The technique is based on the assumption that one knows in advance the patterns that the compiler will produce. As a result, any subsequent optimizations or improvements in a compiler's processing that affect the opcode sequence will break the technique. Executables created with one version of a given compiler will likely be incompatible with executables that are created with a subsequent version of that compiler. Finally, the approach has the disadvantage that its use of unusual opcode sequences may in fact alert hackers, who then can attempt to decode the embedded bits.

What is needed is a technique for creating software in a manner that allows information hiding that is largely transparent to both developers and their end-users. In particular, such an approach should allow software to be conveniently installed and used by end-users, but at the same time support the embedding of hidden information that protects the software against unauthorized copying and distribution. Additionally, the approach should be fairly transparent to the software developer, and thus should not inject additional dependencies or incompatibilities into the development process. The present invention fulfills these and other needs.

SUMMARY OF INVENTION

A development system providing a method for information hiding in executable programs is described. In one embodiment, for example, a method of the present invention is described for hiding information in computer programs, the method comprises steps of: receiving first input comprising program modules for a computer program being created, the program modules including data and code; receiving second input comprising information to be hidden in the computer program; linking together the program modules to form an executable computer program, including determining pads necessary for aligning data and code; and hiding the second input in the executable computer program by storing portions of the second input at locations in the executable computer program intended for pads.

In another embodiment, for example, a system of the present invention for hiding information in computer programs is described that comprises: first input comprising program modules for a computer program being created, the program modules including data and code; second input comprising information to be hidden in the computer program; a linker for linking together the program modules to form an executable computer program, including determining pads necessary for aligning data and code; and a module for hiding the second input in the executable computer program by storing portions of the second input at locations in the executable computer program intended for pads.

In yet another embodiment, for example, in a computer architecture that employs dead spaces for aligning certain portions of a computer program, an improved method of the present invention is described for embedding a data stream in the computer program, the method comprises steps of: determining a sequence of dead spaces that are to be employed throughout the computer program for achieving desired alignments; embedding the data stream in the computer program by replacing selected ones of the sequence of dead spaces with information from the data stream; and recording information allowing the embedded data stream to be reconstituted from the computer program.

DETAILED DESCRIPTION

Glossary

Figure 1:
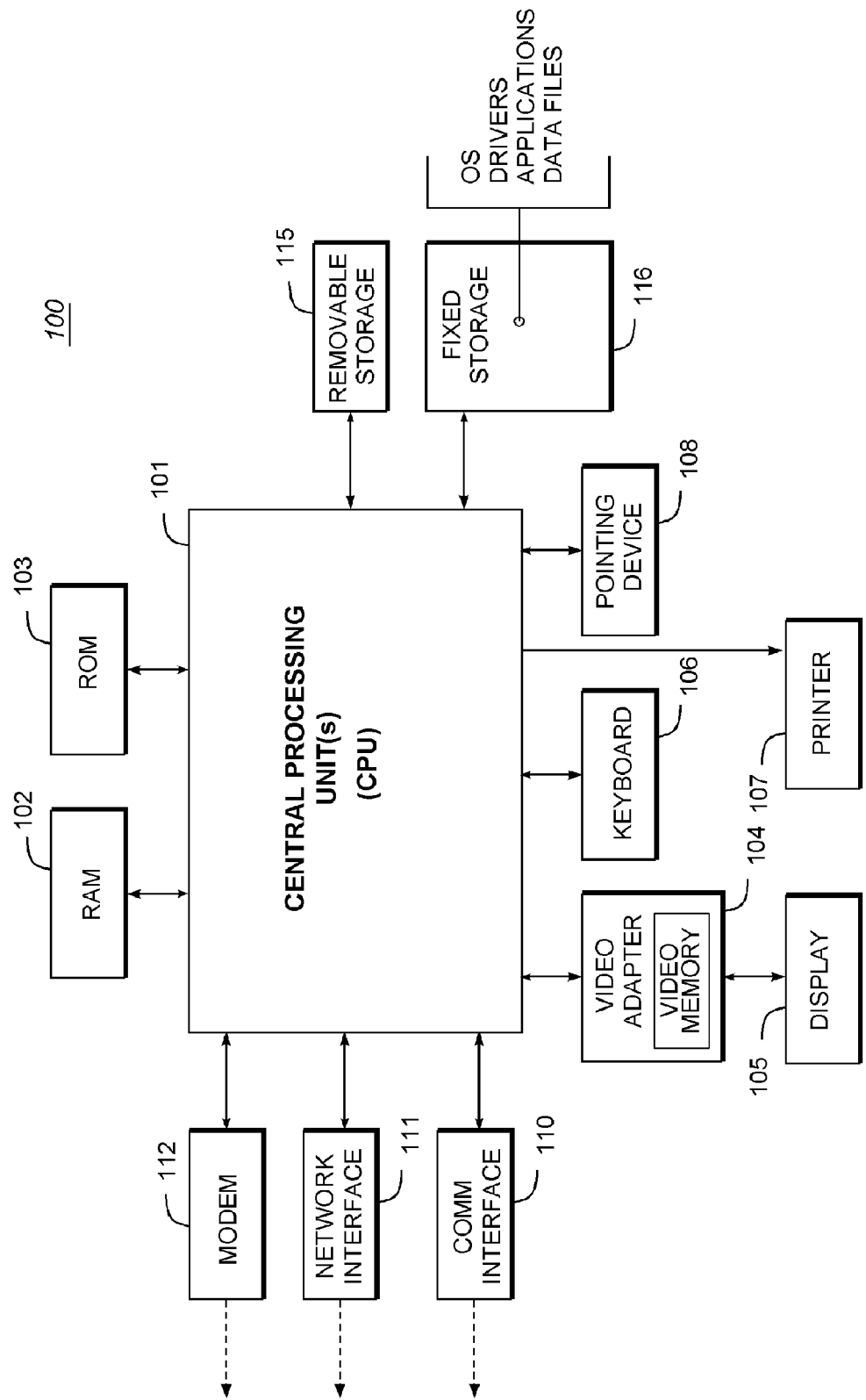
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Compiler: A program that translates source code into object code.

Linker: A program that combines object code modules (.obj) to form an executable program (.exe), including replacing symbolic addresses with real addresses.

Object Code: Binary machine language code produced by a translator program, such as an assembler, interpreter, or compiler. For programs that must be linked, object code does not contain actual addresses, but instead contains symbols corresponding to actual addresses. The final program is generated by linking the object code (.obj) with other object code modules (e.g., libraries and other object code files), to produce an executable file.

Operational Code ("Opcode"): Machine language instruction that specifies the type of instruction and the structure of the data on which the instruction operates. An opcode may define the functionality of an Arithmetical Logic Unit (ALU), such as addition or multiplication operations. The term may be used in a general sense to refer to compiled code comprising both machine code operators and operands.

Steganography: Refers to information hiding where the information is embedded among other information or content in a manner that is difficult to detect. For example, one may embed a secret message in a computer graphics file by replacing unused or less-significant bits with bits of the information to be concealed. This hidden information can be any digitized content, including plain text, cipher text, images, or the like. See, e.g., Schneier, B., Applied Cryptography, Second Edition, John Wiley & Sons, Inc., 1996, particularly at Section 1.2 Steganography, the disclosure of which is hereby incorporated by reference for purposes of indicating the background of the invention or illustrating the state of the art.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
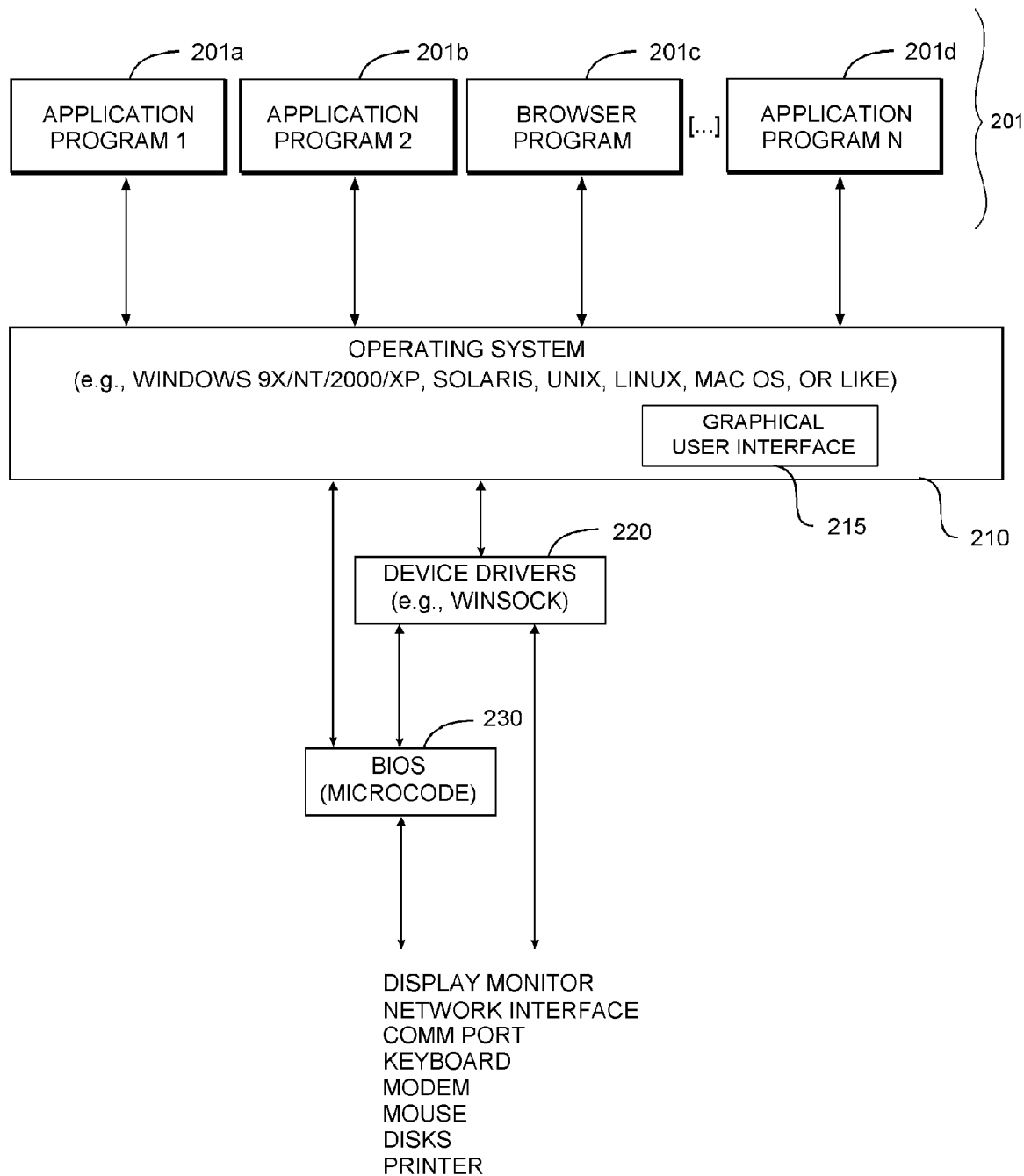
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Base Development System

Figure 3:
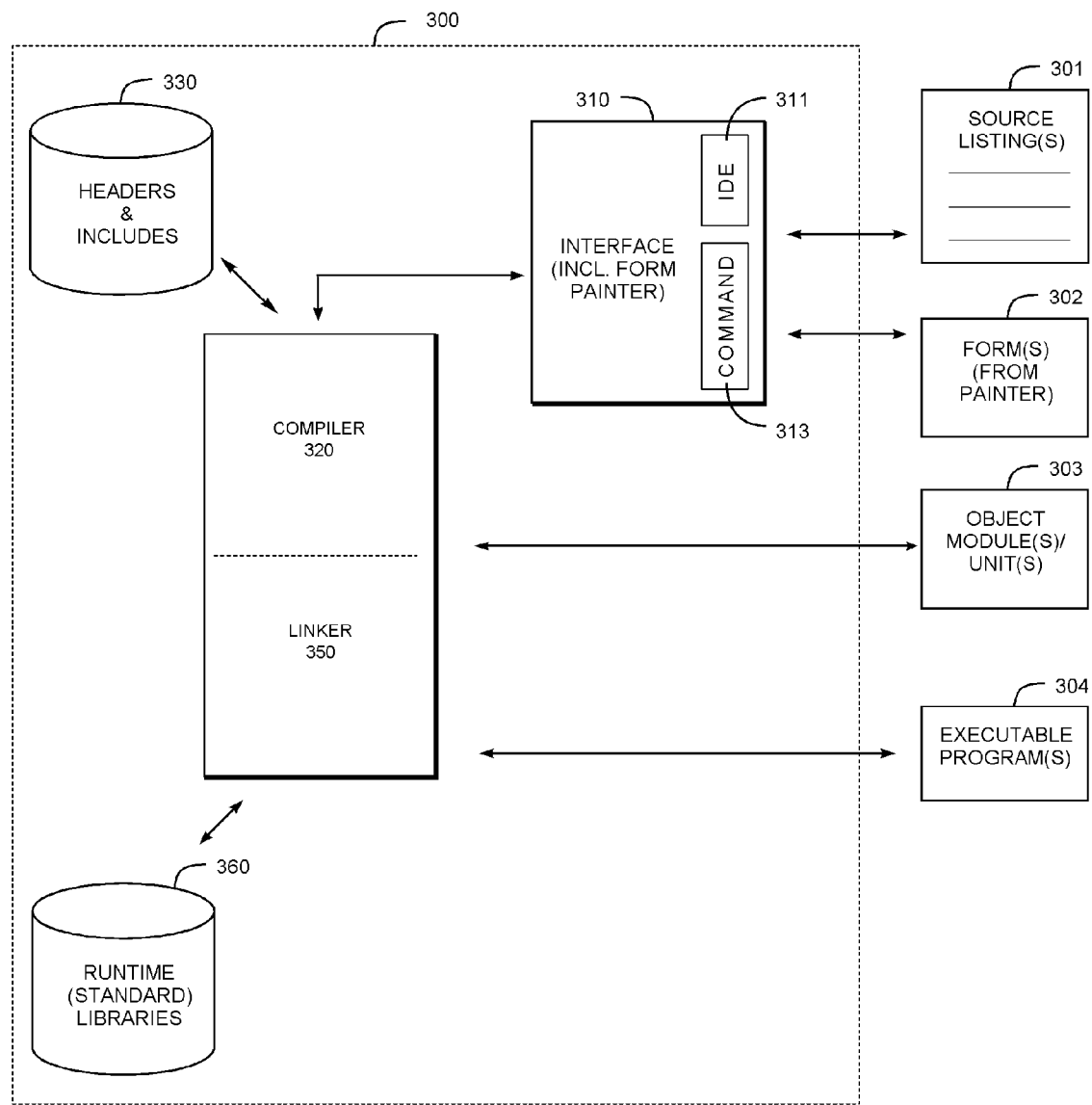
FIG. 3 is a block diagram illustrating a visual development system of the present invention, hosted by the software system, which includes a compiler, a linker, and an interface.

FIG. 3 is a block diagram illustrating a visual development system 300 of the present invention, hosted by software system 200, which includes a compiler 320, a linker 350, and an interface 310. Through the interface 310, a developer user "paints" forms 302 with objects and supplies source listings 301 to the compiler 320. Interface 310 includes both command-line driven 313 and Integrated Development Environment (IDE) 311 interfaces, the former accepting user commands through command-line parameters, the latter providing menuing equivalents thereof. From the source code or listings 301, forms 302, and headers/includes files 330, the compiler 320 "compiles" or generates object code module(s) or compiled "units" 303. In turn, the linker 350 "links" or combines the units 303 with runtime libraries 360 (e.g., standard runtime library functions) to generate executable program(s) 304, which may be executed by a target processor (e.g., the processor of FIG. 1). The runtime libraries 360 include previously-compiled standard routines, such as graphics, I/O routines, startup code, math libraries and the like. A description of the general operation of development system 300 is provided in the manuals accompanying Borland Delphi™.

General operation (i.e., "compilation") by a compiler, such as compiler 320, comprises two main components: a front end and a back end. The "front end" of the compiler parses the source program and builds a parse tree—a well-known tree data structure representing parsed source code. The "back end" traverses the tree and generates code (if necessary) for each node of the tree, in a post-order fashion. For an introduction to the general construction and operation of compilers, see Fischer et al., "Crafting a Compiler with C", Benjamin/Cummings Publishing Company, Inc., 1991, the disclosure of which is hereby incorporated by reference. Further description of the back end of the compiler is provided in commonly-owned U.S. Pat. No. 5,481,708, issued Jan. 2, 1996. Further description of the linker is provided in commonly-owned U.S. Pat. No. 5,408,665, issued Apr. 18, 1995. The disclosures of each of the foregoing patents are hereby incorporated by reference.

The above-described computer hardware and software are presented for purposes of illustrating the basic underlying desktop and server computer components that may be employed for implementing the development environment of the present invention and deploying applications created therefrom. Although the present invention will typically be implemented in such an environment, the present invention is perfectly suited for implementation on a stand-alone computing device. Further, the discussion that follows focuses on the currently preferred embodiment which may be embodied in the Borland Delphi™ development system (available from Borland Software Corporation of Scotts Valley, Calif.). However, the invention is not tied to any particular development system and is well suited for use with a variety of different development environments. More particularly, the present invention may be implemented in any type of system architecture or processing environment capable of supporting the methodologies of the present invention presented in detail below. The following discussion will focus on modifications to the linker 350 which are helpful for understanding the methodology of the present invention for steganographic embedding of information.

Overview of Hiding Information in an Executable Program

In accordance with the present invention, a development system includes a method to lace information throughout an executable file in a manner that is very difficult to discover or remove. The approach of the present invention may be used to embed purchaser identification information into the executable at the time of purchase, providing a significant disincentive to unauthorized duplication without inconveniencing honest users. More particularly, the approach takes advantage of voids (i.e., empty space) within an executable file to carry arbitrary data. The data payload can be encrypted before being embedded into the executable file. The data payload is very difficult to find and extract, even with multiple distinct executable files available for difference analysis. For the software author/vendor holding the mask (i.e., "key mask") used to embed the data into the executable, extraction of the data is trivial.

What makes the data difficult to locate or extract is that it is scattered throughout the executable file a few bytes at a time in hundreds of locations. The data is not isolated in an easily identifiable data chunk. For large executable files (e.g., larger than 100 k or so) the data may be encoded redundantly, so that if the data were modified, removed, or obliterated (e.g., "hacked") in one part of the file the complete information could still be reconstructed based on other parts of the file.

Linker Modifications

Of particular interest herein are modifications made to the above-described linker 350. (In the currently preferred embodiment, the compiler is unaffected.) The linker is where the chunks of code and data that comprise a program are brought together, references resolved, and then emitted as the final executable program. At this point, the machine code (opcode) needs to be aligned on specific address boundaries, as dictated by the underlying computer architecture. Most modern CPU architectures achieve higher execution performance when data and code bytes start on whole multiples of a minimum alignment factor. Some CPU architectures (e.g., RISC) strictly require that all code and data reside on aligned addresses, and failure to align properly results in a hardware fault that can terminate the application. Even in those architectures that do not impose strict requirements, non-aligned code and data typically entail a performance hit during execution (e.g., due to requiring additional memory fetches).

A compiler or linker that emits machine opcode bytes into an executable should place code entry points (subroutines) on aligned addresses. Since the code size of a given routine is unlikely to be an exact multiple of the alignment factor, a compiler or linker emits pad (filler) bytes between code blocks in the executable file to place the next code entry point at an aligned address following the previous code block. For example, the Intel x86 architecture prefers code to start on addresses that are a multiple of 4 or 16 bytes (aligned addresses). Consider, for instance, a routine that is 7 bytes long on an architecture that prefers routines starting on a 16 byte (multiple) address. After a 7-byte routine, an additional 9 bytes are required (16 minus 7) as "padding" so that the next routine starts on an address that is a multiple of 16 bytes. These pad bytes serve no function in the execution of the code. The present invention uses compiler/linker knowledge of where those pad bytes are located in the executable file to embed data between the code or data chunks that comprise the executable file.

Ordinarily, runs of consecutive pad bytes tend to be fairly small, such as 1 to 3 bytes for DWORD (double word, 32-bit) alignment, or 1 to 15 bytes for 16-byte alignment. Thus, individual sections of padding are too small to encode meaningful data. Therefore, the approach of the present invention is to distribute the data payload across multiple pad byte sections. This may be done using two possible techniques: serial fill or mask overlay. Each will be described next.

The serial fill technique fills the pad bytes with data bytes in sequential order. For example, the first three pad bytes in the .exe file may be filled with the first three bytes of data, skip N number of bytes of code in the .exe file, then fill the next two pad bytes with the next two bytes of data, and so on. When the data bytes are exhausted, one continues filling pad bytes from the beginning of the data. Using a mask overlay technique, one may conceptually construct a "mask" template of the available pad byte locations in the .exe file, construct a source template the same length as the .exe file filled with the data bytes repeated back to back, and apply the mask to the source template (logical AND operation) to isolate the specific data bytes to be placed in each pad byte of the executable file.

Another way of looking at the mask overlay technique is using modulo arithmetic. For each pad byte in the executable file, take the file offset (location) of the pad byte, divide by the number of data bytes and keep the remainder (modulo arithmetic). The remainder is the offset within the data bytes of the data to place in that pad byte in the executable file. The serial fill technique is slightly more vulnerable to discovery and attack than the mask overlay technique because the data payload is threaded sequentially through the executable file. A person viewing the executable file with a hex viewer would only need to figure out the pad byte locations of a few dozen consecutive code blocks to reconstruct the data payload.

The mask overlay technique makes the data considerably more difficult to extract than the serial fill technique. Figuring out the pad bytes around several consecutive code blocks would reveal part of the data but not necessarily all of it since the period of repetition of the data bytes is independent of the occurrence of pad bytes. Both techniques are vulnerable to differential analysis comparing two instances of the executable file encoded with different data payloads. This comparison would show the location of the pad bytes that are different, which is likely to be most of them. In the currently preferred embodiment, therefore, the data payload is preferably padded with random noise and encrypted with strong encryption. Noise padding before encryption helps hide the periodicity of the data payload, further strengthening the mask overlay technique. Note that the data payload embedded in the executable file should preferably not be referenced or decoded by the executable itself, or by any other program available to the end user. Decoding the data payload requires knowledge of the key mask that locates all the pad byte locations.

Figure 4A:
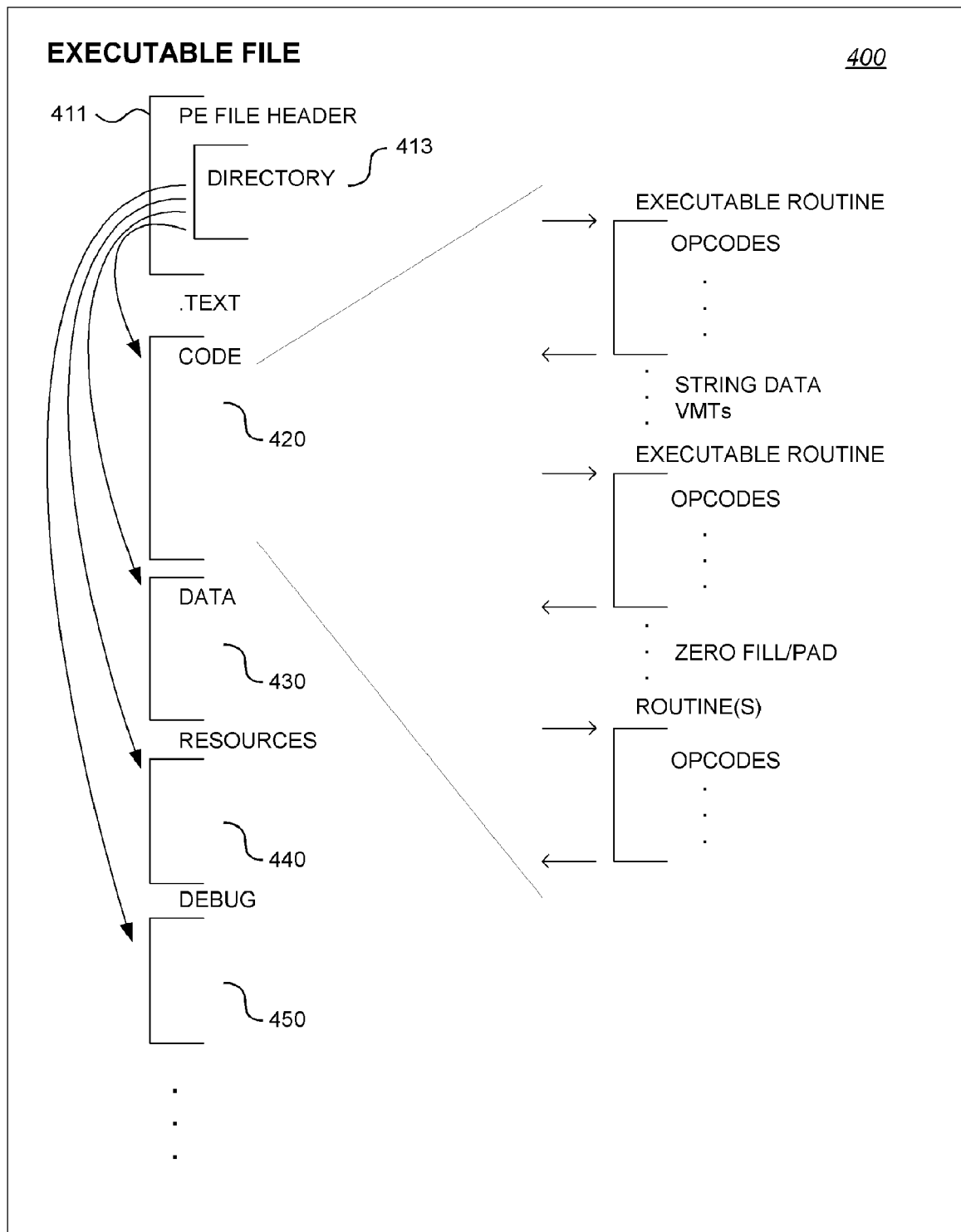
FIG. 4A is a block diagram of an executable file in "PE format."

FIG. 4A is a block diagram of an executable file 400 in "PE format." Windows Win32-based executable (image) files are structured according to Microsoft's Portable Executable (PE) format. PE images are produced by a compatible Win32 linker, such as ones provided by Borland and Microsoft. See, e.g., Pietrek, M., "Peering Inside the PE: A Tour of the Win32 Portable Executable File Format," MSDN, March 1994, which is hereby incorporated by reference for purposes of illustrating the state of the art. A copy is available on the Internet (e.g., presently at msdn.microsoft.com/library/default.asp?url=/library/enus/dndebug/html/msdn_peeringpe.asp).

As shown, the executable file 400 includes different sections. As shown at the top, the file 400 starts with a PE file header 411 which includes multiple components. One component is a directory 413 that points to the offsets (i.e., beginnings) of the other sections, as illustrated. The executable file 400 includes one or more code sections, such as the code section 420. By x86 assembler convention, the code sections are also referred to as TEXT sections. The file 400 also includes a data section 430, a resources section 440, and a debug (info) section 450, all of which are referenced within the directory 413. For Linux executable files, the file may also include a rodata (read-only data) section.

Figure 4B:
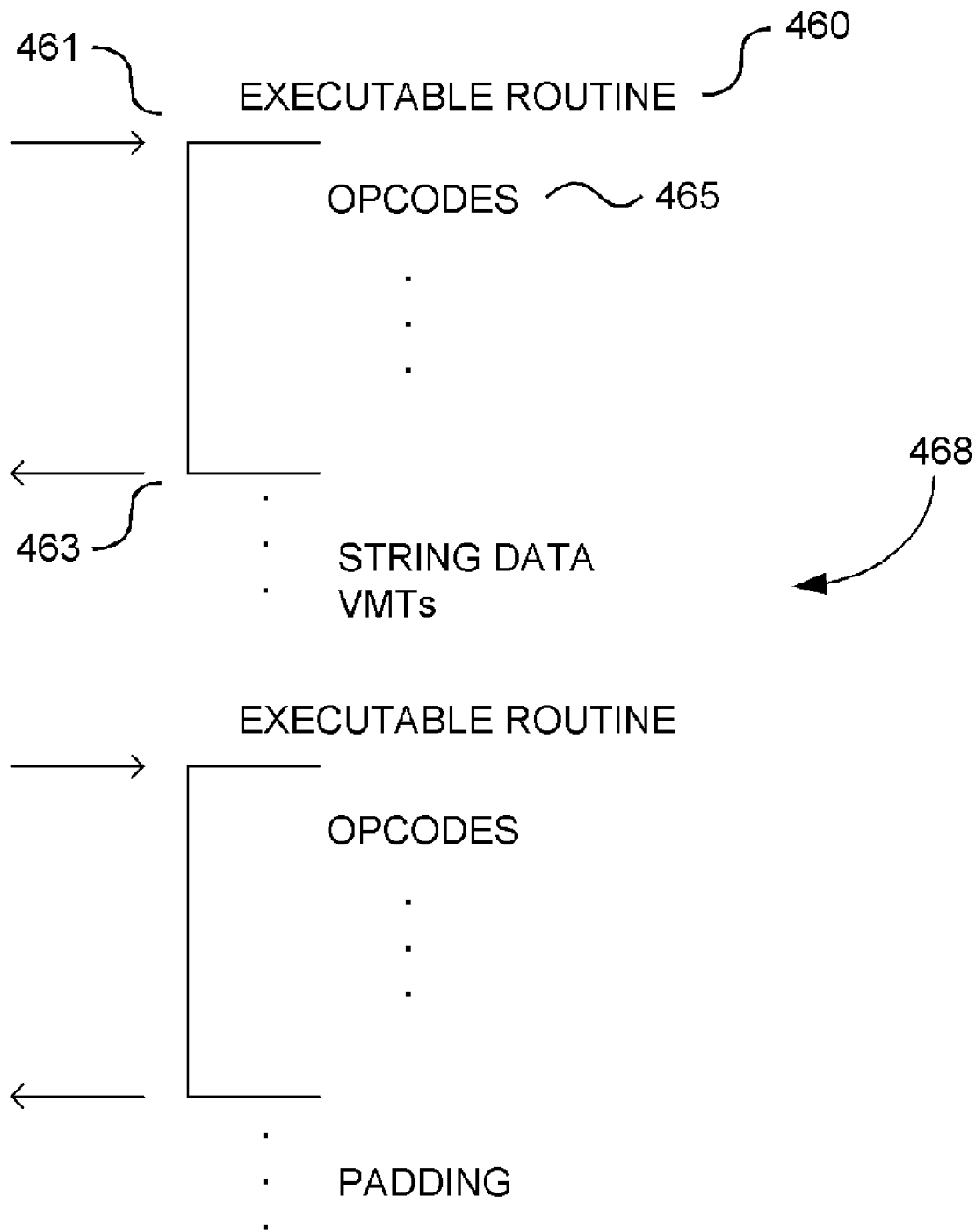
FIG. 4B is a block diagram that illustrates the structure of executable routines in further detail.

The code section 420 contains the bytes of the executable code blocks—that is, the executable routines. FIG. 4B is a block diagram that illustrates the structure of executable routines in further detail. As shown, executable routine 460 includes an entry point 461 and an exit point 463 (or even multiple exit points), and includes the opcodes 465 that comprise the program logic of the routine. Dead space can exist between executable code blocks, such as the dead space shown at 468. In the currently preferred embodiment, the compiler (conventionally) may emit some read-only data in this space, such as (text) string data, as an optimization. This would include, for example, string constants appearing in the source code (i.e., things that are present at runtime that are not modifiable). Given its close proximity, a string constant stored in this manner may be referenced using a relatively small instruction and a small relative offset address (i.e., locality of reference), as opposed to having to retrieve the constant from another section (e.g., using full 32-bit addressing).

In classic assembler programming, string data is placed in the data segment. However, the data segment is usually writable and thus incurs certain overhead as a result. For instance in 32-bit Windows, when an executable file is loaded into memory, the code sections are read-only and can therefore be shared among processes. The data is writable, however, and has to be unique to each individual process. Saving the amount stored in the data segment improves a program's overall memory usage. Virtual method (dispatch) tables, which comprise tables of jumps or pointers to entry points, are typically also placed here. Even the string data and virtual method tables appearing in this dead space may themselves be subject to padding so that each of them starts on a particular boundary (e.g., 4-byte boundary).

As previously discussed, for architectural and/or performance reasons, the entry point of routines must start at a specified (alignment) boundary, such as an address that is a multiple of 16 bytes. In some architectures, the entry point must begin on a page boundary. If the pages themselves are large (e.g., 128 bytes), the amount of padding required can be significant. Although some of this padding or dead space may be used as described above, the space typically remains unused and is therefore typically slated to be filled with zeros or random data. (Zero filling has the advantage that one can compare two versions of an executable more easily, i.e., to verify that they were emitted as the same). With the pad mask steganography technique of the present invention, these dead spaces are instead used to carry encrypted data. Although one could locate the positions where these pieces of data are being carried (if one compared two different versions of a given executable file), different versions of a given executable file are otherwise virtually indistinguishable. Additionally, conventional encryption techniques could be used to add a random pad in front and in back (so that the data payload is somewhere in the middle of a given encrypted block), thereby making it incredibly difficult to perform statistical analysis or other attacks to uncover the data payload.

Although the foregoing discussion has focused on carrying the data payload in code segments, those skilled in the art will appreciate that the approach of the present invention may be adapted to also carry data payloads in other segments, including data segments, resource segments, debug segments, or the like. In the Microsoft Windows environment for 32-bit resources (e.g., icons, string tables, bitmaps, user-defined resources, and the like), for example, there exists a catalog or directory of where resources begin. Alignment is frequently required between resources, and there is no specific indication or requirement as to what goes in the padding in between. In data sections, natural data alignment would be aligning to a power of 2 that is related to the size of data being stored. For instance, a 64-bit integer should be 64-bit aligned, with any necessary padding added to achieve that alignment. Linkers may sort or prearrange data so that byte-size data may be placed in between for more efficient use of data space (i.e., reducing the amount of overall padding required), but padding opportunities still remain in data segments. Padding may be placed in space between the segments themselves (i.e., inter-segment, such as between two code segments, between a data segments and a code segment, and so forth), though such padding may confuse some code integrity utilities, such as lint, since declared sizes may differ from the actual size. However such inter-segment padding would typically not prevent the executable from running (on most platforms).

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The following focuses on modifications to the linker for implementing the present invention. Two approaches are available for keeping track of the pads. Ordinarily, when the unmodified linker emits code, it just rounds up to the next offset (location) that is necessary (to achieve the desired alignment) and then emits the code. One straightforward approach, therefore, is to record each offset where a pad is created. For example, this information could be recorded to file as a sequence of offset/size value pairs. This could be followed by embedding the data payload as a post-link process. In particular, after the linking process is complete, a utility reads the recorded pad information from the file, and then proceeds to embed the data payload using the specified available pads (i.e., as indicated by offset/size entries).

An alternative approach is to merge both of the foregoing together—that is, give the linker both the executable code to emit to disk as well as the data stream to embed. Here, instead of emitting zero-byte filled pads, the linker instead emits information from the data stream. Suppose, for instance, that the linker is to emit a 3-byte pad at a given point in the code. Instead of emitting three bytes of zeros, the linker emits the next three bytes from the data stream to be embedded.

The data payload itself may be encrypted using conventional encryption technique. Generally, cryptographic systems use either "secret-key" encryption or "public key" encryption. In "secret-key" encryption, a single key is used for both encryption and decryption. A high-quality, fast, conventional secret-key encryption algorithm may be used to encipher the original unenciphered message or "plaintext" data, to create an encrypted data stream for embedding. The actual "bulk" enciphering mechanism employed can be any symmetric algorithm, including for instance, CAST (Carlisle Adams and Stafford Tavares), IDEA (International Data Encryption Algorithm), Blowfish, DES, or DES variants (e.g., such as triple-DES). See, e.g., Bruce Schneier, The IDEA Encryption Algorithm, Dr. Dobb's Journal, December 1993; Bruce Schneier, The Blowfish Encryption Algorithm, Dr. Dobb's Journal, April 1994, pp. 38-40; and Data Encryption Standard (DES), as published by the National Bureau of Standards, Department of Commerce, FIPS, pub 46, January 1977, pp. 653-670. For a description of DES variants, see, e.g., Schneier's previously mentioned Applied Cryptography text. The disclosures of each of the foregoing are hereby incorporated by reference for purposes of illustrating the state of the cryptographic art.

Although single-key encryption is faster than public key encryption, it has the limitation that the same key must be shared if more than one party is to have the ability to decrypt the encrypted content. Therefore, in instances where that is inconvenient or undesirable, public key (asymmetric) encryption, such as RSA-based public key encryption or DSS/Diffie-Hellman public key encryption, may be used instead. For a description of RSA public key encryption, see e.g., U.S. Pat. No. 4,405,829 (Sep. 20, 1983), entitled CRYPTOGRAPHIC COMMUNICATIONS SYSTEM AND METHOD. For a description of DSS/Diffie-Hellman public key encryption, see e.g., U.S. Pat. No. 4,200,770 (Apr. 29, 1980), entitled CRYPTOGRAPHIC APPARATUS AND METHOD. The disclosures of each of the foregoing are hereby incorporated by reference for purposes of illustrating the state of the cryptographic art.

Encrypted blocks may include additional pre-padding and post-padding random or "noise" bytes to further obfuscate the information contained within a given block. Once the information to be embedded is encrypted, the resulting encrypted data stream is overlaid on the executable. The actual overlay itself is in the currently preferred embodiment recorded as an overlay mask, which indicates where the encrypted information is to be laced throughout the executable. This allows the encrypting party to determine encrypted pad bytes from ordinary pad bytes. In the currently preferred embodiment, the overlay mask is a separate file (not distributed with the executable) that is produced by the linker; it lists the offset and size of each encrypted pad location (throughout the executable file). If desired, the encrypted data stream may be overlaid in a redundant manner, so that the encrypted information is resistant to alteration or destruction of portions of the executable file. Note that there is not a single block of data available to attack, as the encrypted data stream is instead dispersed throughout the executable file.

It is possible to include the mask overlay information with the executable file itself, when desired for the particular context of an application being able to discover the encrypted information (e.g., displaying customer information in an About box). In such instances, separate streams and separate encoding paths should be employed, so that only one of the two is discoverable by the application at runtime because the application refers to it (e.g., via a catalog of entry points); the other one is not referred to by the application. For anti-piracy uses, however, the mask would typically not be included with the executable.

Figure 5A:
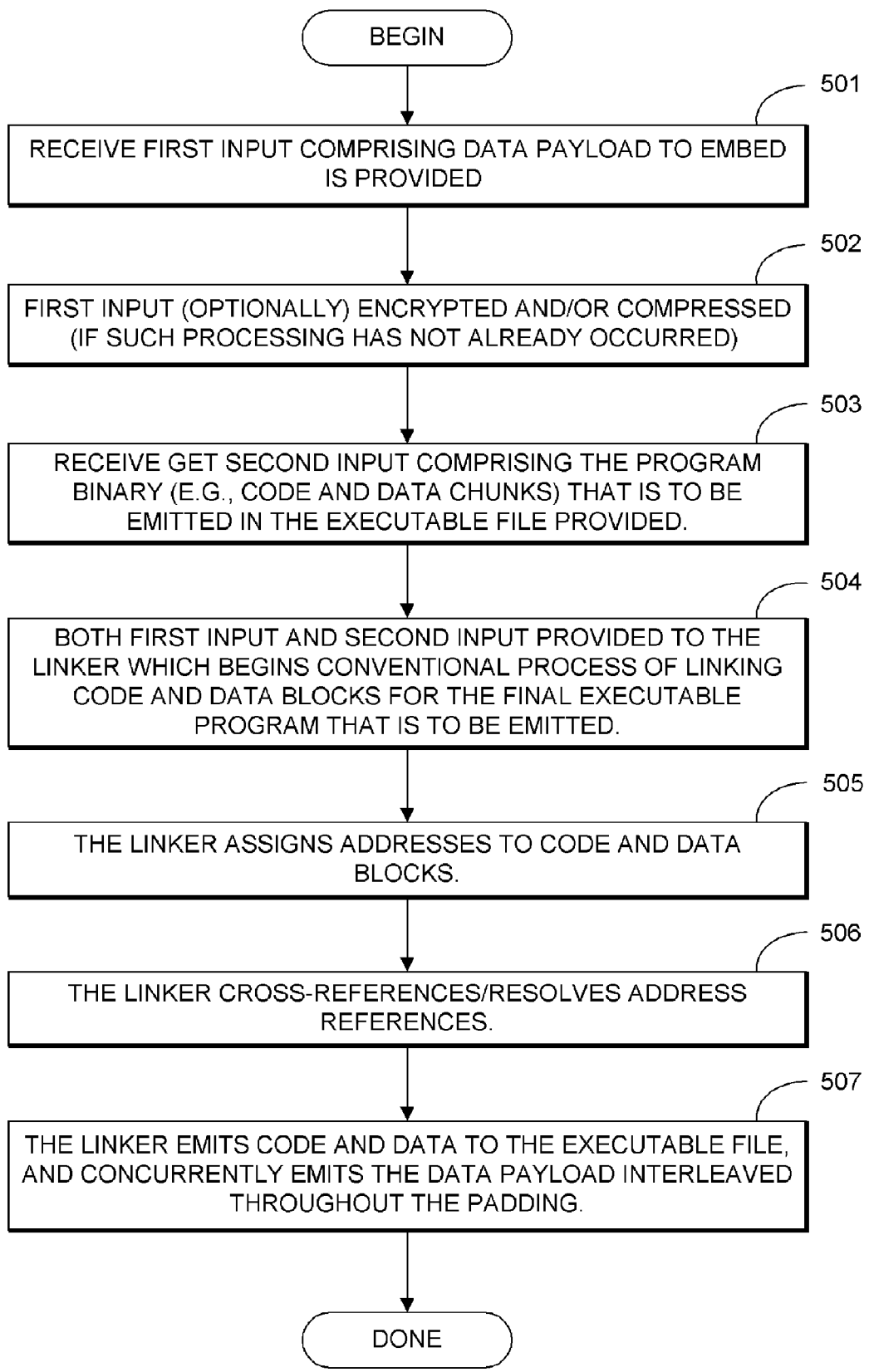
FIG. 5A is a flowchart illustrating the pad mask steganography methodology of the present invention.

FIG. 5A is a flowchart 500 illustrating the pad mask steganography methodology of the present invention. At step 501, a first input comprising the data payload to embed is provided to the process. This input may be (optionally) encrypted and/or compressed as indicated at step 502 (in the case that such processing has not already occurred for the input). As indicated at step 503, a second input provided to the process comprises the program binary (e.g., code and data chunks) that is to be emitted in the executable file. (Resources, which are marked as needed, are typically handled separately as address assignment is not performed by the linker.) This second input is the "object code" (.obj) that includes opcodes in a non-executable format, as the opcodes (at this point during the compile/link process) include references that have yet to be resolved. For the commercial embodiment of Borland Delphi, the object code is referred to as the "units." Both the first input and second input are provided to the linker.

Figure 5B:
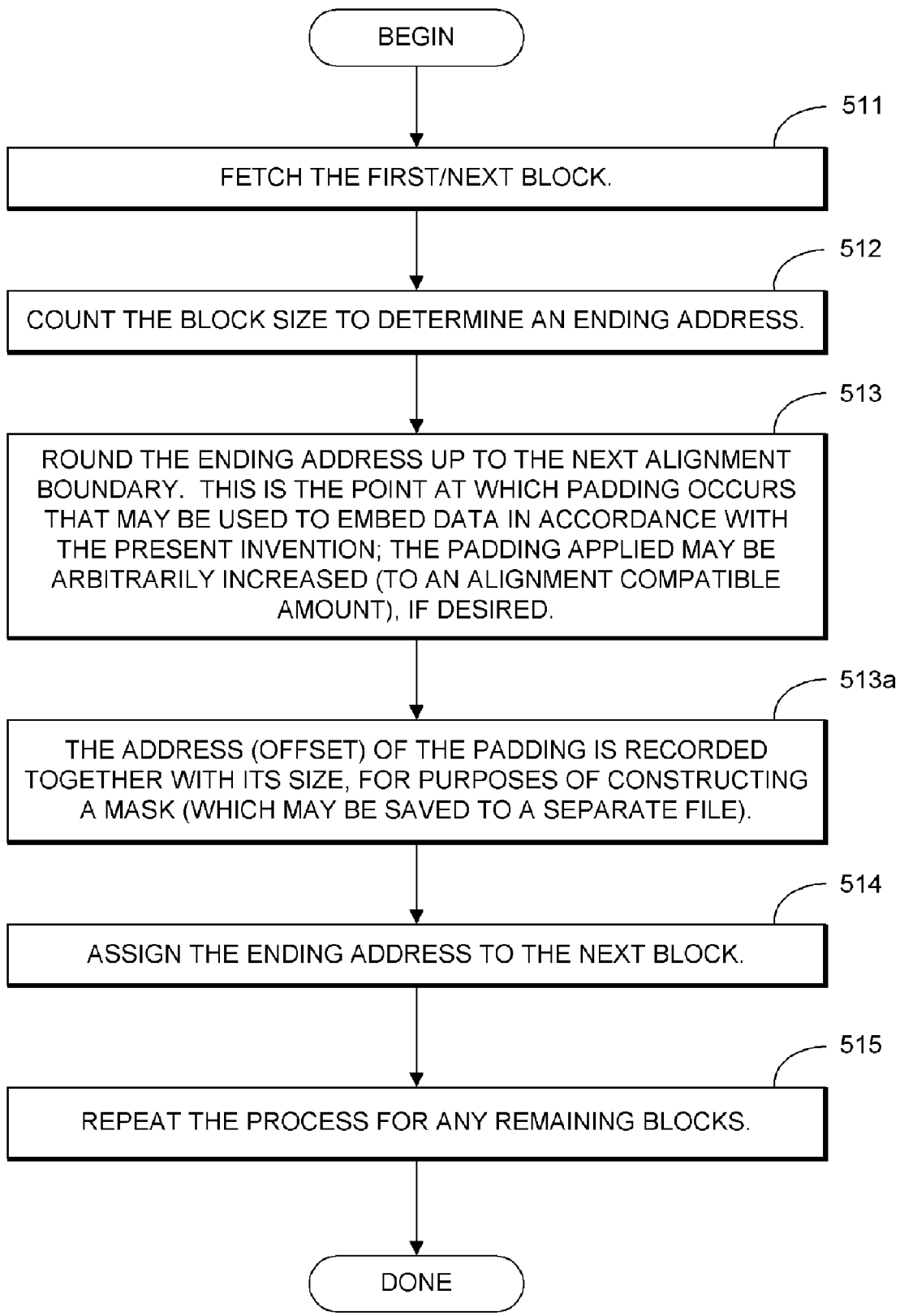
FIG. 5B is a flowchart illustrating substeps of the methodology of FIG. 5A.

At step 504, the linker begins the conventional process of "smart linking"—that is, identifying code and data blocks that are actually needed for the final executable program that is to be emitted. It should be understood that "smart linking" is the approach in the presently preferred embodiment, but the methodology of the present invention can also be used with a "dumb" linker. Whereas a smart linker takes only the code and data blocks that are referenced in the program, a dumb linker takes all code and data blocks for the executable (including ones that end up not being referenced or used). At step 505, the linker assigns addresses to code and data blocks. FIG. 5B is a flowchart 505 illustrating the substeps of step 505: starting with the first/next block (step 511), count the block size to determine an ending address (step 512), round that address up to the next alignment boundary (step 513), assign that address to the next block (step 514), and repeat the process for any remaining blocks (step 515). Step 513 is the point at which padding occurs that may be used to embed data in accordance with the present invention; the padding applied at this step may be arbitrarily increased (to an alignment compatible amount), if desired. Therefore, step 513*a* is added to show that the address (offset) of this padding is recorded together with its size, for purposes of constructing a mask (which may be saved to a separate file, as previously described).

Once the linker has performed the foregoing process on all blocks, a particular address is associated with every symbol present in the code and data chunks. The linker may now cross-reference/resolve address references, as indicated at step 506 (returning back to FIG. 5A). Now, the linker is ready to emit code and data to the executable file (.exe). Therefore, as the final step 507, the linker emits the code and data to the executable file, and concurrently emits the data payload interleaved throughout the padding. Any unused padding may be emitted as zero-byte or random data. After the binary of the executable is emitted, resources and debug info sections may be appended to the file. Thereafter, the pad mask (which includes a sequence of pad offsets/sizes) may be used to retrieve a sequence of pad blocks to reconstitute or recombine the embedded data stream. Once reconstituted, the data stream may be decrypted and/or decompressed, if applicable.

In an embodiment where the methodology is done as a two-phase process, the data payload is interleaved after the executable is emitted, such as by a post-link utility that reads the executable's key mask. This would be the most efficient way to encode multiple different payloads in the very same executable file (as opposed to repeating the linking process each time).

As an alternative to recording a separate mask, the previously mentioned serial fill technique could be applied. In that case, the foregoing approach may be modified, for instance, to have each pad block (that is used for data embedding) include an offset field that stores the address to the next pad block, thereby effectively establishing a linked list of pad blocks. The offset to the first block may be recorded (e.g., in an arbitrary field available in the PE header), or may be implied (e.g., understood per a design specification). Additionally, apart from recording the size of each block in a mask, the size (ending point) may instead be discerned through other means; for example, by using a predefined terminator, by using a size (count) field within each pad, or by inferring a pad's size based on the starting address of the next known code or data chunk.

COMMERCIAL APPLICATION

One commercial application of the methodology of the present invention is to mark an executable file with user/licensee identification in electronic software distribution or site licensing to a specific user or corporate client. For example, customer purchase information from an online sale (e.g., customer name, address, credit card number, and so forth) may be embedded into the executable file to act as a deterrent from that person unlawfully copying or distributing the file. Such information may be conveniently applied at the point of purchase by simply embedding the information in a post-link fashion, based on the executable file's key mask.

While the invention is described in some detail with specific reference to a single-preferred embodiment and certain alternatives, there is no intent to limit the invention to that particular embodiment or those specific alternatives. For instance, although the foregoing discussion has focused on opcodes, those skilled in the art will appreciate that the approach of the present invention may be extended to byte code instruction streams (e.g., Java and .NET). In those environments, the opportunity for exploiting padding in accordance with the present invention again arises. Further, environments that support unreachable bytes in the middle of an executable routine (i.e., apart from any padding between routines) may be modified in accordance with the present invention. An example of this would be a code stream that jumps over a block and never jumps back into it, which would provide an opportunity for that block to be exploited in accordance with the present invention. Therefore, those skilled in the art will appreciate that modifications may be made to the preferred embodiment without departing from the teachings of the present invention.

What is claimed is:

1. A method for hiding information in computer programs, the method comprising:
    receiving first input comprising program modules for a computer program being created, said program modules including data and code;
    receiving second input comprising information to be hidden in the computer program;
    linking together the program modules to form an executable computer program, including determining pads necessary for aligning data and code;
    hiding the second input in the executable computer program by storing portions of the second input at locations in the executable computer program intended for pads, wherein said second input is hidden in a redundant manner in the executable computer program, so that said second input may still be reconstituted when portions of the executable computer program have been modified, removed, or obliterated;
    linking in additional modules comprising resource and debug info; and
    hiding portions of the second input within said additional modules.

2. The method of claim 1, wherein said program modules comprise object code modules that are to be linked together to form an executable computer program.

3. The method of claim 1, wherein said second input comprises a data stream to be embedded in the computer program.

4. The method of claim 3, wherein said data stream is encrypted before being hidden in the computer program.

5. The method of claim 4, wherein said data stream is encrypted using asymmetric encryption technique.

6. The method of claim 4, wherein said data stream is encrypted using symmetric encryption technique.

7. The method of claim 3, wherein said data stream is compressed before being hidden in the computer program.

8. The method of claim 1, wherein said second input comprises customer licensing information.

9. The method of claim 8, wherein said customer licensing information is hidden in the computer program after receiving an online purchase request for the computer program.

10. The method of claim 1, further comprising:
    during the linking step, recording each pad's location and size in the executable computer program.

11. The method of claim 10, further comprising:
    from pad locations and sizes, creating a mask indicating where in the executable computer program said second input is hidden.

12. The method of claim 11, further comprising:
    using the mask, extracting portions of the second input stored among the pads; and
    recombining the portions together to reconstitute the second input.

13. The method of claim 11, wherein the hiding step includes:
    using the mask, modifying the executable computer program after the linking step to replace various ones of the pads with portions of the second input.

14. The method of claim 11, wherein the hiding step includes:
    during the linking step, replacing various ones of the pads that were to be emitted with portions of the second input.

15. The method of claim 1, wherein data and code alignment are required for execution of the computer program on a given processor architecture.

16. The method of claim 1, wherein data and code alignment are required for efficient memory fetching during program operation.

17. The method of claim 1, wherein said pads comprise non-executable, non-data filler bytes.

18. A system for hiding information in computer programs, the system comprising:
   first input comprising program modules for a computer program being created, said program modules including data and code;
   second input comprising information to be hidden in the computer program;
   a linker for linking together the program modules to form an executable computer program, including determining pads necessary for aligning data and code;
   a module for hiding the second input in the executable computer program by storing portions of the second input at locations in the executable computer program intended for pads, wherein said second input is hidden in a redundant manner in the executable computer program, so that said second input may still be reconstituted when portions of the executable computer program have been hacked;
   a module for linking in additional modules comprising resource and debug info; and
   a module for hiding portions of the second input within said additional modules.

19. The system of claim 18, wherein said program modules comprise object code modules that are to be linked together to form an executable computer program.

20. The system of claim 18, wherein said second input comprises a data stream to be embedded in the computer program.

21. The system of claim 20, wherein said data stream is encrypted before being hidden, in the computer program.

22. The system of claim 21, wherein said data stream is encrypted using asymmetric encryption technique.

23. The system of claim 21, wherein said data stream is encrypted using symmetric encryption technique.

24. The system of claim 20, wherein said data stream is compressed before being hidden in the computer program.

25. The system of claim 18, wherein said second input comprises customer licensing information.

26. The system of claim 25, wherein said customer licensing information is hidden in the computer program after receiving an online purchase request for the computer program.

27. The system of claim 18, wherein the linker records each pad's location and size in the executable computer program.

28. The system of claim 27, wherein the linker records a mask indicating where in the executable computer program said second input is hidden.

29. The system of claim 28, further comprising:
   a module for extracting portions of the second input stored among the pads using the mask, and recombining the portions together to reconstitute the second input.

30. The system of claim 28, further comprising:
   a module for modifying the executable computer program after linking to replace various ones of the pads with portions of the second input.

31. The system of claim 28, wherein the linker replaces various ones of the pads that were to be emitted with portions of the second input.

32. The system of claim 18, wherein data and code alignment are required for execution of the computer program on a given processor architecture.

33. The system of claim 18, wherein data and code alignment are required for efficient memory fetching during program operation.

34. The system of claim 18, wherein said pads comprise non-executable, non-data filler bytes.

\* \* \* \* \*